United States Patent
Bartley et al.

(10) Patent No.: US 10,169,623 B2
(45) Date of Patent: Jan. 1, 2019

(54) SECURITY APPARATUS FOR COMPUTING SYSTEMS

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Chatfield, MN (US); Mark J. Jeanson, Rochester, MN (US); Mark O. Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/292,990

(22) Filed: Oct. 13, 2016

(65) Prior Publication Data

US 2018/0107847 A1  Apr. 19, 2018

(51) Int. Cl.
| | |
|---|---|
| *G06F 21/00* | (2013.01) |
| *G06F 21/86* | (2013.01) |
| *G01S 15/88* | (2006.01) |
| *G01S 15/42* | (2006.01) |
| *G06F 21/88* | (2013.01) |

(52) U.S. Cl.
CPC .............. *G06F 21/86* (2013.01); *G01S 15/42* (2013.01); *G01S 15/88* (2013.01); *G06F 21/88* (2013.01)

(58) Field of Classification Search
None
See application file for complete search history.

(56) References Cited

U.S. PATENT DOCUMENTS

| | | | |
|---|---|---|---|
| 7,391,316 B2 | 6/2008 | Albert et al. | |
| 2004/0199420 A1* | 10/2004 | Bhakta | G06Q 30/02 705/14.4 |
| 2010/0061564 A1* | 3/2010 | Clemow | G10K 11/1788 381/71.6 |
| 2011/0258930 A1 | 10/2011 | Francis et al. | |
| 2014/0373091 A1 | 12/2014 | Kimer et al. | |

(Continued)

OTHER PUBLICATIONS

Falarski, M. D. "Acoustic characteristics of a semispan wing equipped with an externally blown jet flap including results at forward speed." NASA TM X-2749 (1973).

(Continued)

*Primary Examiner* — David Le
(74) *Attorney, Agent, or Firm* — Patterson + Sheridan, LLP

(57) ABSTRACT

A security apparatus that can detect unauthorized alterations of physical arrangement of a computing system or unauthorized movements of a computing system through the use of acoustic signals is designed. Modules of a computing system including the security apparatus are able to generate acoustic measurements from received returned acoustic signals. Also, the modules are able to derive baseline acoustic measurements based on stored acoustic profiles. If, for any module of the computing system, its generated acoustic measurements do not substantially match its baseline acoustic measurements, the mismatch may indicate that there is an unauthorized alteration of physical arrangement of the computing system or an unauthorized movement of the computing system. Thus, the security apparatus in the module may take actions to prevent access to the sensitive data stored in the module.

20 Claims, 7 Drawing Sheets

(56) References Cited

U.S. PATENT DOCUMENTS

2016/0011071 A1* 1/2016 Wilson .................. G01M 3/226
73/40.7
2017/0315675 A1* 11/2017 Lewis ................... G06F 3/0481

OTHER PUBLICATIONS

Harbarchuk et al., . "A new method for computer sound steganography based on Fourier transform and frequency masking." Актуальні проблеми економіки 12 (2009): 240-250.

Harma et al., "Automatic surveillance of the acoustic activity in our living environment." 2005 IEEE International Conference on Multimedia and Expo. IEEE, 2005.

Atlas et al., "Applications of Time-Frequency Analysis to Signals from Manufacturing and Machine Monitoring Sensors." Proceedings of the IEEE, vol. 84, No. 9, Sep. 1996.

Hua et al. "Audio Authentication by Exploring the Absolute-Error-Map of ENF Signals." IEEE Transactions on Information Forensics and Security 11.5 (2016): 1003-1016.

\* cited by examiner

SECURITY APPARATUS FOR COMPUTING SYSTEMS

BACKGROUND

The present disclosure relates to the design of a security apparatus for computing systems, and more specifically, to the design of a security apparatus that can detect unauthorized alterations of physical arrangement of computing systems or unauthorized movements of the computing systems through the use of acoustic signals.

In applications where highly sensitive data are stored in a computing system, these sensitive data could be accessed without authorization or tampered with. Thus, the security of the computing system could be breached.

SUMMARY

One embodiment of the present disclosure provides a security apparatus. The security apparatus includes a transmitter configured to transmit acoustic signals in a computing system according to an acoustic pattern. The security apparatus includes a receiver configured to receive returned acoustic signals in response to the transmitted acoustic signals. The security apparatus also includes a logic configured to: generate acoustic measurements from the returned acoustic signals based on the acoustic pattern; compare the generated acoustic measurements to baseline acoustic measurements, wherein the baseline acoustic measurements are derived from acoustic profiles corresponding to a default physical arrangement of the computing system, and upon determining that the generated acoustic measurements do not substantially match the baseline acoustic measurements, assert a signal indicating that the default physical arrangement of the computing system has been altered.

One embodiment of the present disclosure provides a computer program product for a security apparatus. The computer program product includes a non-transitory computer-readable storage medium having computer readable program code embodied therewith. The computer readable program code generates acoustic measurements from returned acoustic signals based on an acoustic pattern. A transmitter in the security apparatus is configured to transmit acoustic signals in a computing system according to the acoustic pattern, and a receiver in the security apparatus is configured to receive the returned acoustic signals in response to the transmitted acoustic signals. The computer readable program code also compares the generated acoustic measurements to baseline acoustic measurements. The baseline acoustic measurements are derived from acoustic profiles corresponding to a default physical arrangement of the computing system. Upon determining that the generated acoustic measurements do not substantially match the baseline acoustic measurements, the computer readable program code further asserts a signal indicating that the default physical arrangement of the computing system has been altered.

One embodiment of the present disclosure provides a method. The method includes transmitting acoustic signals in a computing system according to an acoustic pattern and receiving returned acoustic signals in response to the transmitted acoustic signals. The method also includes generating acoustic measurements from the returned acoustic signals based on the acoustic pattern; comparing the generated acoustic measurements to baseline acoustic measurements, wherein the baseline acoustic measurements are derived from acoustic profiles corresponding to a default physical arrangement of the computing system, and upon determining that the generated acoustic measurements do not substantially match the baseline acoustic measurements, asserting a signal indicating that the default physical arrangement of the computing system has been altered.

DETAILED DESCRIPTION

Figure 1:
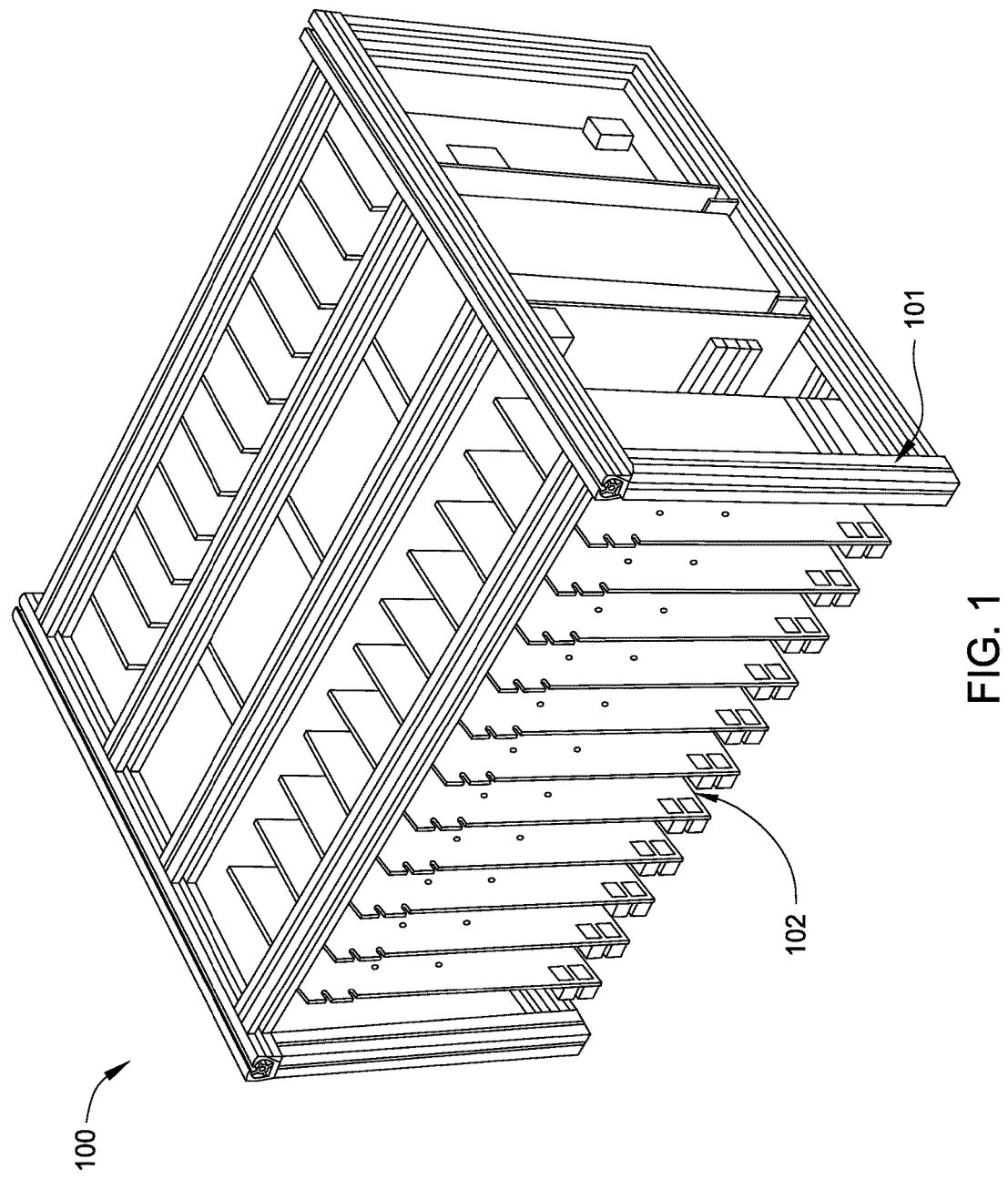
FIG. 1 shows a computing system, according to one embodiment herein.

Multiple modules or processing units are often installed together within a rack computing system. These modules may contain memory elements that store sensitive data. In order to prevent unauthorized access or tamper to the sensitive data, it is important to ensure security of the computing system that contains these modules.

A computing system containing modules with sensitive data is often housed in a secure and guarded facility such as a navy ship, or other military installation, or secure non-military commercial facilities, or data-centers. If the external housing that houses the computer system is intruded, the sensitive data may be accessed without authorization and thus security of the computing system is breached. Another example of a security breach is that one or more modules may be stolen from the computing system or may be tampered with. Another example of a security breach is where the computing system is transported from the external housing to an unsecure location without authorization.

The embodiments herein describe a security apparatus to address the above mentioned security breaches of a computing system. Specifically, the security apparatus can detect unauthorized alterations of the physical arrangement of hardware components or unauthorized movements of a computing system through the use of acoustic signals. In one embodiment, the modules of the computing system can recognize a default physical arrangement of the computing system in a desired location of an environment where the modules were desired to operate. Also, the modules of the computing system can detect a current physical arrangement of the computing system in a current location where they are currently located or operated. If, for example, during a power-on procedure, any module of the computing system does not recognize the current physical arrangement of the computing system or the current location it detects using acoustic signals, this may indicate that there is an unauthorized alteration of physical arrangement of the computing system or the current location is not safe. Thus, that module may take actions to prevent access to the sensitive data stored in the module or elsewhere in the computing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a computing system 100 according to one embodiment herein. As shown in FIG. 1, the computing system 100 is a rack system that includes a frame 101. Multiple modules 102 are contained within the frame 101 of the computing system 100. In one embodiment, the modules 102 may be Peripheral Component Interconnect (PCI) or Peripheral Component Interconnect Express (PCIE) cards. In other embodiments, the modules may include non-volatile memory elements, as known in the art. Each of the modules 102 includes a security apparatus (not shown in FIG. 1). The security apparatus may be integrated into the modules 102 and is used to secure the data stored in the corresponding module. According to one embodiment herein, if the physical arrangement of the computing system is altered without authorization, the security apparatus can detect the unauthorized alteration of physical arrangement and take actions to prevent access to the data stored in the corresponding module. For example, if any module 102 of the computing system 100 is tampered with, the security apparatuses in that module 102 can detect the tampering and take actions to prevent access to the data stored in the module, e.g., erase the data stored in the module. According to another embodiment herein, if the computing system is moved to an unsecure location without authorization, the security apparatuses in the modules 102 can detect the unauthorized movement and take actions to prevent access to the data stored in the modules. The computing system 100 may also include one or more processors, video cards, hard disk drives, accelerators, network cards, power supplies, cooling systems and/or memories which may be coupled to the frame 101 or disposed on a different module (e.g., a motherboard), as known in the art. For simplicity of illustration, those other hardware components are not shown in FIG. 1.

Figure 2:
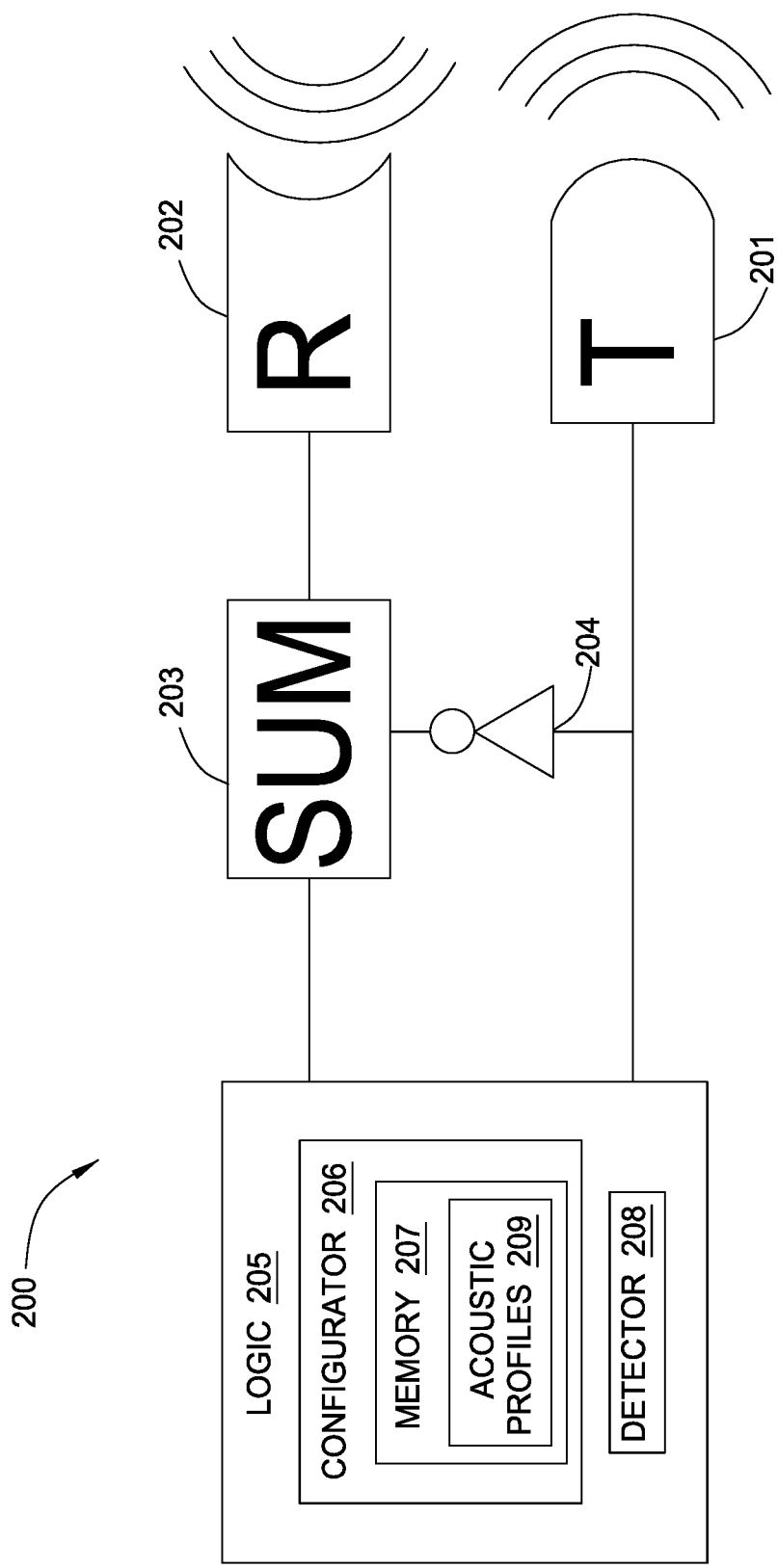
FIG. 2 shows a security apparatus, according to one embodiment herein.

FIG. 2 illustrates a security apparatus 200 according to one embodiment herein. The security apparatus 200 includes a transmitter 201 to transmit acoustic signals and a receiver 202 to receive acoustic signals. In one embodiment, the transmitter 201 and the receiver 202 can work simultaneously. That is, the security apparatus 200 can transmit and receive acoustic signals simultaneously. In one embodiment, the security apparatus 200 can transmit acoustic signals and receive its own transmitted acoustic signals so that the security apparatus 200 can recognize its own transmitted acoustic signals.

The security apparatus 200 also includes an adder 203 and an inverter 204. With the adder 203 and the invertor 204, the security apparatus 200 can remove or negate its own transmitted acoustic signals from the received acoustic signals. As shown in FIG. 2, in one embodiment, the received acoustic signals can subtract its own transmitted acoustic signals, i.e., add the inverted transmitted acoustic signals, from the received acoustic signals. In this way, the security apparatus 200 can identify or recognize changes to the acoustic signals caused by other components in the computing system such as echoes, reflections, etc. which will be useful to ensure the security of the computing system 100, as described in detail below.

The security apparatus 200 also includes a logic 205 that includes a configurator 206 to configure the security apparatus 200. The configurator 206 can generate transmitted acoustic signals and sample received acoustic signals. Based on the transmitted acoustic signals and the received acoustic signals when the computing system 100 is under a default physical arrangement in a desired location, the configurator 206 can generate acoustic profiles describing acoustic characteristics of the computing system 100. The configurator 206 includes a memory 207 to store the acoustic profiles 209. The logic 205 also includes a detector 208 that detects unauthorized alterations of a physical arrangement or unauthorized movements of the computing system 100. The detector 208 can also take actions to prevent access to the data stored in a module 102 of the computing system 100 that includes the security apparatus 200.

The acoustic signals transmitted or received by the security apparatus 200 are not limited to the acoustic signals that are audible by human beings. The acoustic signals may also be ultra-sound acoustic signals with higher frequencies than 20000 Hz or intra-sound acoustic signals with lower frequencies than 20 Hz. The acoustic signals may be pulsed or continuous acoustic signals.

Figure 3A:
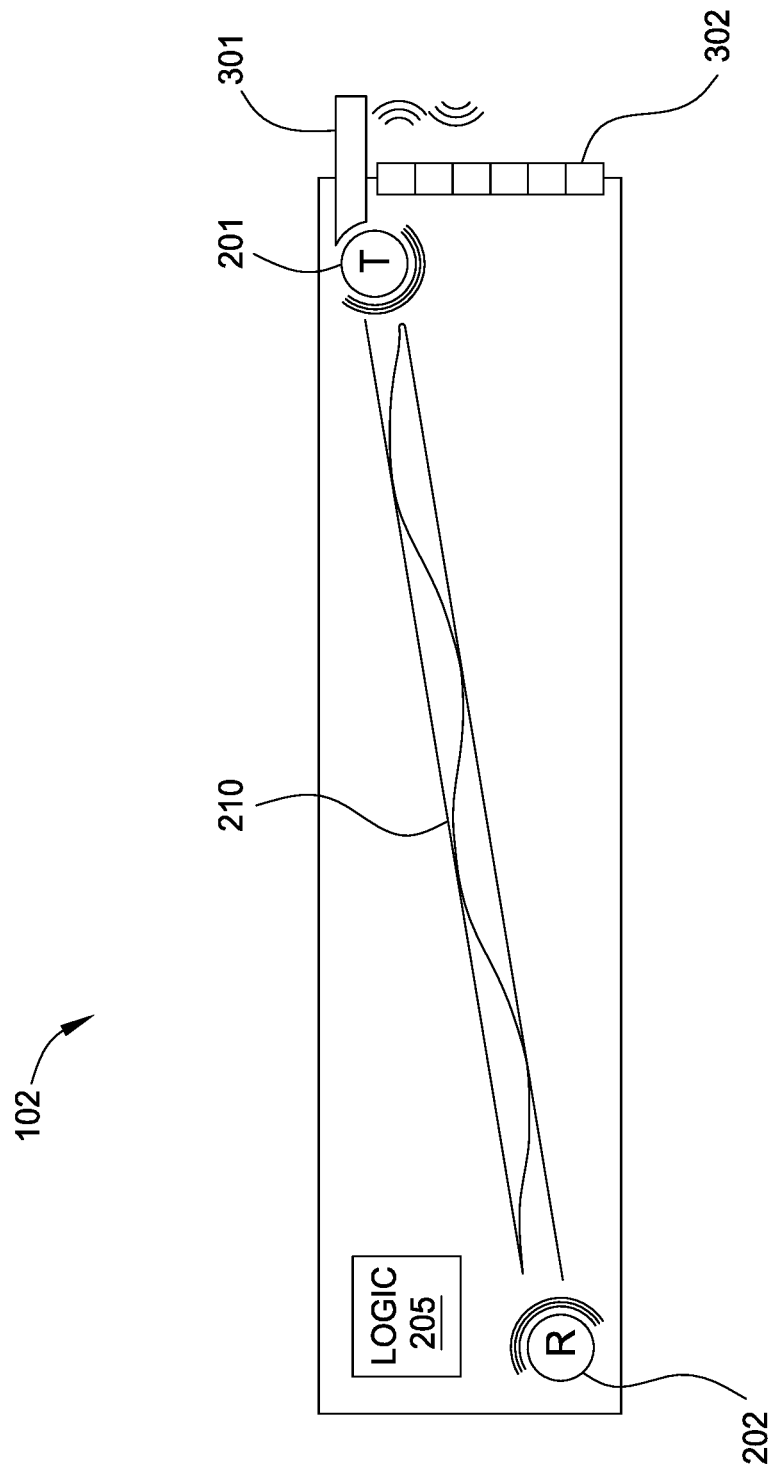
FIG. 3A shows a module including a security apparatus, according to one embodiment herein.

FIG. 3A shows a module 102 according to one embodiment herein. The module 102 includes a security apparatus 200. As shown in FIG. 3, the transmitter 201, the receiver 202 and the logic 205 of the security apparatus 200 are separately located in the module 102. The transmitter 201 is located near a connector 302 of the module 102 which connects the module 102 to the computing system 100. In one embodiment, the connector 302 may be a PCI card connector or a PCIE card connector. The transmitter 201 is also coupled to an acoustic connector 301 of the module 102. The acoustic connector 301 can propagate the acoustic signals transmitted by the transmitter 201. In one embodiment, the acoustic connector 301 is a hollow structure to propagate the acoustic signals. In other embodiments, the acoustic connector 301 can have a solid structure, e.g., a solid metal, to propagate the acoustic signals. With the structure as shown in FIG. 3A, when the transmitter 201 of the module 102 transmits acoustic signals, the transmitted acoustic signals are propagated to the receiver 202 through the material of the module 102, indicated as 210 in FIG. 3A.

Thus, the receiver 202 of the module 102 can receive its own transmitted acoustic signals. In one embodiment, the substrate of the module 102 can be a printed circuit board (PCB).

Figure 3B:
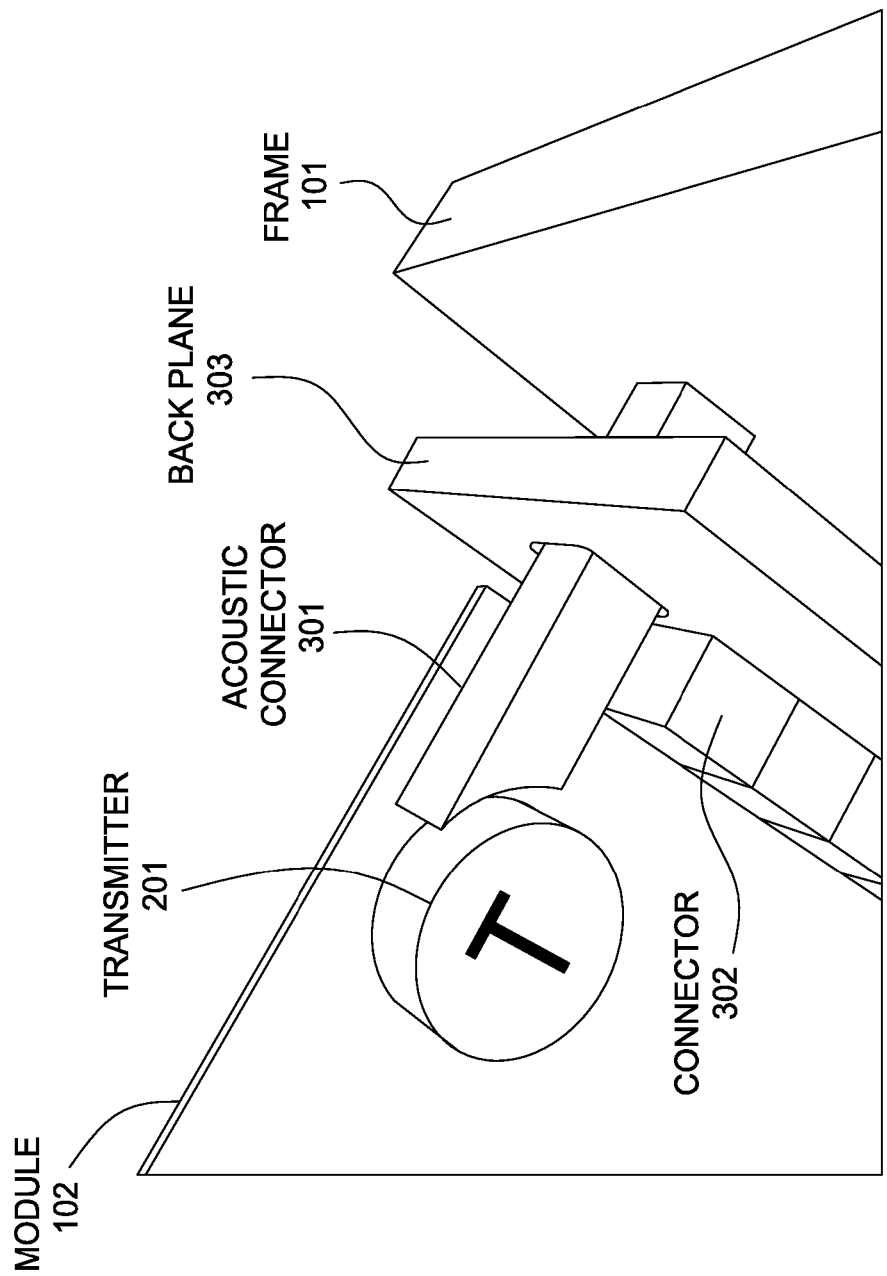
FIG. 3B shows a structure that installs the module of FIG. 3A in a computing system, according to one embodiment herein.

FIG. 3B shows a structure that installs the module 102 of FIG. 3A in the computing system 100, according to one embodiment herein. As shown in FIG. 3B, when the module 102 of FIG. 3A is installed in the computing system 100, the connector 302 of the module 102 is coupled to a backplane 303 of the computing system 100. In one embodiment, the backplane 303 is a group of electrical connectors in parallel with each other, wherein each pin of each electrical connector is linked to the same relative pin of all the other electrical connectors to form a computer bus. The backplane 303 can be used as a backbone to connect multiple modules 102 together to make up a complete computing system. The backplane 303 can be disposed on a PCB.

Also, the acoustic connector 301 of the module 102 is coupled to the frame 101 of the computing system 100. Specifically, the acoustic connector 301 extends from the transmitter 201 to the frame 101 through the back plane 303. In this embodiment, the acoustic connector 301 extends from the transmitter 201 to the frame 101 through an opening of the backplane 303, as shown in FIG. 3B.

With the arrangement as shown in FIG. 3B, when the module 102 is installed in the computing system 100, the transmitter 201 will be located near the frame 101 of the computing system 100. In this way, when the transmitter 201 of the module 102 transmits acoustic signals, the transmitted acoustic signals are propagated to the receiver 202 through the module 102, as shown in FIG. 3A. Thus, the receiver 202 of the module 102 will receive its own transmitted acoustic signals. Also, the receiver 202 of the module 102 can receive returned signals, e.g., echo, from the computing system 100, in response to the transmitted acoustic signals. Moreover, the acoustic connector 301 can propagate the acoustic signals transmitted by the transmitter 201 along the frame 101 of the computing system 100 to other modules of the computing system 100, as explained in FIG. 4 below.

Figure 4:
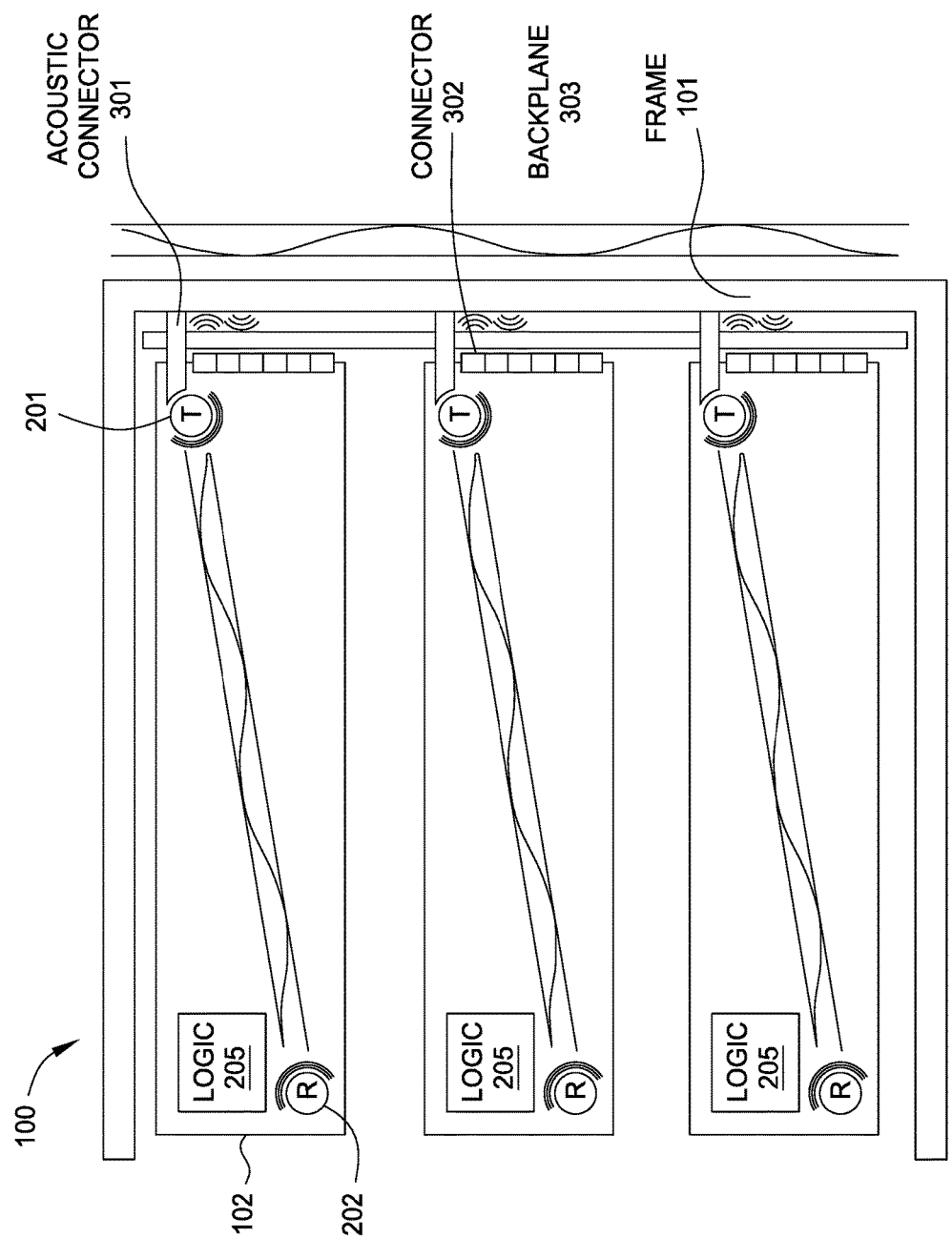
FIG. 4 shows a structure of a computing system including multiple modules, according to one embodiment herein.

FIG. 4 shows a structure of the computing system 100 including multiple modules according to one embodiment herein. In FIG. 4, the computing system 100 includes three modules 102 as described in FIG. 3A. Each module 102 is installed in the computing system 100 in the same way as shown in FIG. 3B. When multiple modules 102 are installed in the computing system 100 in the same way as shown in FIG. 3B, the acoustic signals transmitted from the transmitter 201 in each module 102 are propagated along the frame 101 to other modules of the computing system 100. Thus, when the transmitter 201 of one module 102 transmits acoustic signals, the receiver 202 of that module will receive its own transmitted acoustic signals propagated to the receiver 202 through that module 102. Also, the acoustic connector 301 of that module can propagate the transmitted acoustic signals along the frame 101 of the computing system 100 to other modules of the computing system 100. Thus, the receivers 202 of other modules will receive returned acoustic signals from the frame 101 of the computing system 100 in response to the transmitted acoustic signals.

FIG. 4 shows only one exemplary embodiment herein. In other embodiments, the computing system 100 may include different number of modules 102. In other embodiments, during manufacturing of the frame 101, the frame 101 may have cavities or contain additional materials to reinforce the propagation of the acoustic signals along the frame 101. Other designs to reinforce the propagation of the acoustic signals along the frame 101 may include damping of reflected waves at end points or edges of the frame 101. Standard wave guide analysis may be used in the modeling of the frame 101 to enhance carrying capability of the acoustic signals by the frame 101.

According to one embodiment herein, the modules 102 of the computing system 100 can generate acoustic characteristics of the computing system 100 when the computing system 100 is disposed at a desired location of an environment which may be a secure location, e.g., a locked room or a guarded facility. The acoustic characteristics are generated under a default physical arrangement of the computing system 100. The learned acoustic characteristics of the computing system 100 can be stored as acoustic profiles 209 in the memory 207 of the logic 205, as shown in FIG. 2. Also, the modules 102 of the computing system 100 are able to detect current acoustic signals generated in a current location where they are currently located or operated. The current acoustic signals are generated under a current physical arrangement of the computing system 100 in the current location. In one embodiment, the modules 102 of the computing system 100 generate acoustic measurements from the current acoustic signals. Also, the modules 102 of the computing system 100 generate or derive baseline acoustic measurements using the stored acoustic profiles If, for example, during a power-on procedure, any module 102 of the computing system 100 detects a mismatch between the baseline acoustic measurements and the acoustic measurements from the current acoustic signals, the mismatch may indicate that the current physical arrangement of the computing system 100 is different from the default physical arrangement of the computing system 100. In this situation, there may be an unauthorized alteration of physical arrangement of the computing system 100. The mismatch may also indicate that the current location is not the desired location, i.e., the computing system 100 was moved without authorization. Thus, that module 102 may take actions to prevent access to the sensitive data stored in that module.

Before the security apparatus 200 in each module 102 can be used to detect unauthorized alteration of physical arrangement of the computing system 100 or unauthorized movements of the computing system 100, the security apparatus 200 in each module 102 learns and stores acoustic profiles generated under the default physical arrangement of the computing system 100 in the desired location where the modules 102 were desired to operate. That is, the security apparatus 200 in each module 102 is configured before it can be used to ensure security.

In one embodiment, two configurations are performed by the configurator 206 of the security apparatus 200 in each module 102. The first configuration is called a calibration configuration. The calibration configuration is performed in the manufacturing factory. That is, the calibration configuration is performed before a module 102 including the security apparatus 200 is installed in the computing system 100. In one embodiment, in the calibration configuration, for each module 102 including the security apparatus 200, a set of predefined acoustic signals is programmed or stored into the logic 205 of the security apparatus 200 during the manufacturing of the module 102. For example, the set of predefined acoustic signals can be programmed or stored into the memory 207 of the security apparatus 200 during the manufacturing of the module 102.

When performing the calibration configuration, each module 102 is calibrated individually. In one embodiment, when calibrating one module 102, the transmitter 201 of that module 102 individually transmits the set of predefined acoustic signals. The receiver 202 of that module 102 individually receives its own transmitted acoustic signals propagated through the module 102. Based on the received acoustic signals, e.g., the amplitude and frequencies of the received acoustic signals, the module 102 can determine its own acoustic characteristics. The acoustic characteristics of a module 102 may include but not limited to damping factors, natural or resonance frequencies that indicate how material and structure of the module 102 affect its own transmitted acoustic signals. The module 102 can store its own acoustic characteristics as acoustic profiles 209 in the logic 205.

In one embodiment, during the calibration configuration of the configuration, each module 102 individually tests or identifies its natural frequency or resonance frequency based on the transmitted predefined acoustic signals. After the testing, for each module 102, the predefined acoustic signals that have the module's natural frequency or resonance frequency can be used as the optimal predefined acoustic signals to achieve the best performance while in operation. In another embodiment, each module 102 individually tests or measures the amplitude of its vibration in response to the transmitted predefined acoustic signals. After the testing, for each module 102, the predefined acoustic signals that cause the module to vibrate at the maximum amplitude are used as the optimal predefined acoustic signals to achieve the best performance while in operation.

In one embodiment, during the calibration configuration, for each module 102, the security apparatus 200 analyzes the transmitted acoustic signals to ensure that the transmitted acoustic signals are not in the audible range of a human so that the modules 102 is not disruptive to humans while in operation.

After the calibration configuration is performed individually for each module 102, the security apparatus 200 in each module 102 knows or learns its own acoustic characteristics.

The second configuration is called a set-up configuration. The set-up configuration is performed after a plurality of modules 102 are installed in the computing system 100. It is understood that the calibration configuration for the plurality of modules 102 had been finished during the manufacturing of the plurality of modules 102. In one embodiment, the set-up configuration is performed in the desired location where the modules 102 were desired to operate. When performing the set-up configuration, the computing system 100 is under a default physical arrangement that is desired for operating the computing system 100.

Figure 5:
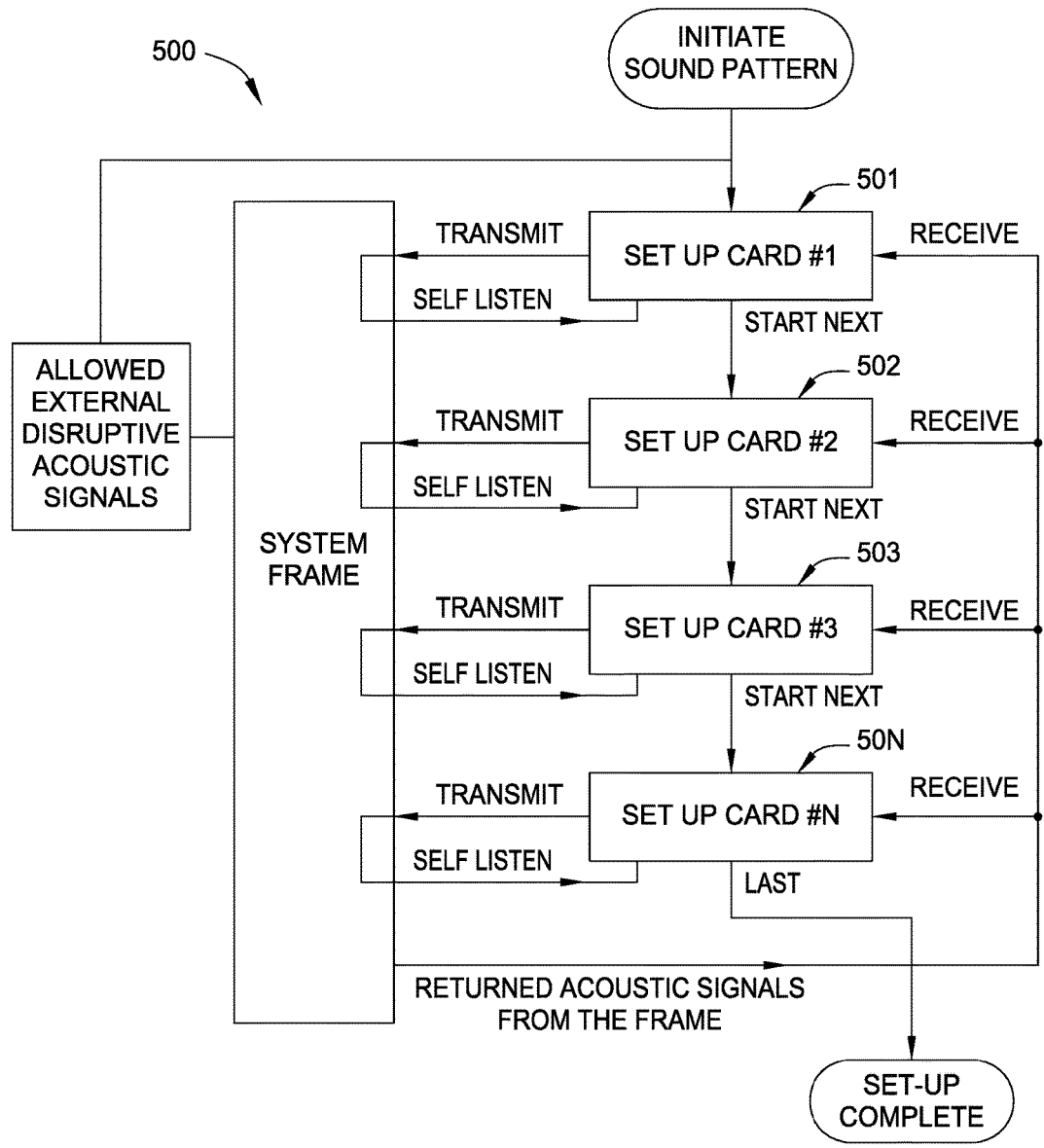
FIG. 5 shows a set-up configuration for multiple modules of a computing system, according to one embodiment herein.

FIG. 5 shows a set-up configuration 500 for multiple modules 102 installed in the computing system 100, according to one embodiment herein. Before the set-up configuration starts, each module 102 is instructed to transmit acoustic signals according to an initial acoustic pattern when the set-up configuration starts. The initial acoustic pattern is known to each module 102. In one embodiment, for each module 102, the initial acoustic pattern includes the optimal predefined acoustic signals for the module 102, as explained above. When performing the set-up configuration, each module 102 is set-up individually. As shown in FIG. 5, the set-up configuration starts with the first module, i.e., module #1 at block 501. When configuring module #1 at block 501, the transmitter 201 in module #1 individually transmits acoustic signals according to the initial acoustic pattern for module #1. That is, when the transmitter 201 in module #1 transmits acoustic signals, all other modules (from module #2 to module #N) are silent, i.e., not transmitting any acoustic signals. Simultaneously, the receivers 202 in each module 102 from module #1 to module #N are receiving the acoustic signals generated by transmitter 201 in module #1 according to module #1's initial acoustic pattern.

Specifically, the receiver 202 in module #1 is receiving its own transmitted acoustic signals propagated through module #1. That is, the receiver 202 in module #1 is self-listening as shown in FIG. 5. Moreover, module #1's transmitted acoustic signals also propagate along the frame 101 of the computing system 100. As such, the receiver 202 in module #1 may also receive returned acoustic signals, e.g., echo, from the frame 101 of the computing system 100, other modules 102, other hardware components (e.g., motherboard, processors, cooling devices, power supplies, hard drives, etc.) as shown in FIG. 5. In other words, the received acoustic signals at module #1 includes both its own transmitted signals and the returned acoustic signals from other components of the computing system 100. Thus, the material and physical arrangement of the computing system 100 can affect the received acoustic signals measured at module #1.

Because module #1 knows its own transmitted acoustic signals after its calibration configuration is performed, the security apparatus 200 in module #1 can subtract its own transmitted acoustic signals from the received acoustic signals by using the adder 203 and the inverter 204 of the security apparatus 200. In this way, the security apparatus 200 in module #1 knows or learns the returned acoustic signals its receiver 202 receives from the computing system 100 (other than from itself), when its transmitter 201 individually transmits acoustic signals according to its initial acoustic pattern under the default physical arrangement of the computing system 100 in the desired location. Based on the returned acoustic signals, e.g., the amplitude and frequencies of the returned acoustic signals, the security apparatus 200 in module #1 can determine the acoustic characteristics, e.g., damping factors, natural or resonance frequencies, of the computing system 100 measured at module #1's location, when module #1's transmitter 201 individually transmits acoustic signals according to module #1's initial acoustic pattern under the default physical arrangement of the computing system 100 in the desired location. In this manner, the security apparatus 200 in module #1 can measure acoustic characteristics of the computing system 100 as a whole.

Simultaneously, when the transmitter 201 in module #1 is transmitting acoustic signals, the transmitted acoustic signals are also propagated along the frame 101 to other modules of the computing system 100. Thus, for each of other modules from module #2 to module #N, the receiver 202 is also receiving module #1's transmitted acoustic signals propagated along the frame 101 of the computing system 100, as shown in FIG. 5. Therefore, based on the received acoustic signals, e.g., the amplitude and frequencies of the received acoustic signals, the security apparatuses 200 in each of other modules (i.e., module #2 to module #N) determine the acoustic characteristics, e.g., damping factors, natural or resonance frequencies, of the computing system 100 measured at the corresponding module's location, when module #1's transmitter 201 individually transmits acoustic signals according to module #1's initial acoustic pattern under the default physical arrangement of the computing system 100 in the desired location. Thus, the security apparatuses 200 in the other modules can determine acoustic characteristics of the computing system 100 when only the transmitter 201 in module #1 is transmitting signals.

After the set-up configuration is performed for module #1, the above set-up configuration for module #1 is performed in the same way for module #2 to module #N. That is, when the transmitter 201 of one module is transmitting acoustic signals according to its initial acoustic pattern, all other modules are silent and the receivers 202 of all modules are receiving returned acoustic signals. As shown in FIG. 5, the set-up configuration is performed from module #2 to module #N one by one individually from block 502 to block 50N.

After all the modules 102 in the computing system 100 are set up individually, the set-up configuration is complete. Based on the returned or received acoustic signals, each module 102 can determine the acoustic characteristics of the computing system 100 measured at the location of the module. The acoustic characteristics of the computing system 100 can be sampled and stored as acoustic profiles 209 in the logic 205 of the security apparatus 200 in each module 102. In one embodiment, the acoustic characteristics of the computing system 100 can be sampled by the configurator 206 and stored in the memory 207 of the security apparatus 200 in each module 102.

In one embodiment, as shown in FIG. 5, during the set-up configuration, allowed external disruptive acoustic signals can be introduced into the returned acoustic signals received by the modules 102. Examples of allowed external disruptive acoustic signals include but not limited to environmental or mechanical noises such as pumps, fans, doors and drawers on the computing system 100. The allowed external disruptive acoustic signals indicate allowable or authorized actions such as repairing of the modules 102 or maintaining of the computing system 100. In one embodiment, when allowed external disruptive acoustic signals exist, the physical arrangement of the computing system 100 may be changed with authorization or the location of the computing system 100 may be changed with authorization. In one embodiment, the allowed external disruptive acoustic signals may be known or periodic acoustic noisy signals. These known or periodic acoustic noisy signals can be sampled and stored into the initial acoustic pattern for the modules 102 as a part of the transmitted acoustic signals.

By introducing allowed external disruptive acoustic signals, after the set-up configuration for each module 102 is performed, each module 102 knows or learns the returned acoustic signals its receiver 202 receives, when its transmitter 201 individually transmits acoustic signals according to its initial acoustic pattern with the existence of allowed external disruptive acoustic signals. Also, each module 102 knows or learns the acoustic signals its receiver 202 receives, when each transmitter 201 of all other modules individually transmits acoustic signals according to those modules' respective initial acoustic pattern with the existence of allowed external disruptive acoustic signals. Similarly as above, based on the returned or received acoustic signals, each module 102 can determine the acoustic characteristics of the computing system 100 measured at that module's location in the presence of external disruptive acoustic signals. The acoustic characteristics of the computing system 100 in the presence of external disruptive acoustic signals can be sampled and stored as acoustic profiles 209 in the logic 205 of the security apparatus 200 in each module 102.

In one embodiment, one or more of the modules 102 of the computing system 100 may need to be repaired or upgraded. In this situation, the repaired or upgraded modules 102 need to re-perform the two configurations. That is, the repaired or upgraded modules 102 perform the calibration configuration individually. Also, after the repaired or upgraded modules 102 are re-installed in the computing system 100, all the modules 102 within the computing system 100 may perform the set-up configuration individually again, as shown in FIG. 5.

In one embodiment, one or more new modules 102 may be added to the computing system 100 or may replace existing modules. In this situation, the calibration configuration may have already been performed by the one or more new modules 102. After the one or more new modules 102 are installed in the computing system 100, the modules 102 within the computing system 100 perform the set-up configuration again, as shown in FIG. 5.

In one embodiment, the modules 102 in the computing system 100 are not changed. However, one or more other components in the computing system 100, e.g., memories, hard disks or processors may be replaced, repaired or added. Or the computing system 100 is moved to another desired location. In these situations, the modules 102 only perform the set-up configuration again, as shown in FIG. 5.

After all the modules 102 in the computing system 100 are set up individually as explained above, the set-up configuration is completed. Now the modules 102 of the computing system 100 are ready to operate.

The modules 102 of the computing system 100 operate according to an operational acoustic pattern. An operational acoustic pattern indicates how the transmitters 201 in the modules 102 transmit acoustic signals while in operation. In operation, each receiver 202 in the modules 102 knows the operational pattern. That is, in operation, each receiver 202 in the modules 102 knows the acoustic signals that its own transmitter 201 transmits and also knows the acoustic signals, e.g., amplitude and frequencies, that transmitters 201 in other modules 102 transmit. For example, one exemplary operational acoustic pattern is that the transmitters 201 in all the modules 102 transmit known acoustic signals according to their respective initial acoustic pattern simultaneously. When this exemplary operational acoustic pattern is performed, the receivers 202 in all the modules 102 receive acoustic signals in response to the transmitted acoustic signals by all the modules 102.

The security apparatus 200 in each module 102 can generate or derive acoustic measurements when all the modules 102 transmit acoustic signals according to their respective initial acoustic pattern simultaneously. For example, module #1 can measure the amplitude and the frequencies of the current returned acoustic signals from the computing system 100 (other than from itself). Also, module #1 can measure the current acoustic characteristics, e.g., the current damping factors, natural or resonance frequencies of the computing system 100 based on the received acoustic signals. Other modules can generate or derive their acoustic measurements similarly.

Moreover, the security apparatus 200 in each module 102 can generate or derive baseline acoustic measurements from the stored acoustic profiles 209, which describe acoustic characteristics when the computing system 100 is under a default physical arrangement in a desired location. For example, module #1 can derive the expected returned acoustic signals from the computing system 100, e.g., the expected amplitude and frequencies of the returned acoustic signals, based on the acoustic characteristics that module #1 learned during the set-up configuration. Also, module #1 knows the expected acoustic characteristics, e.g., the expected damping factors, natural or resonance frequencies of the computing system 100, stored in the acoustic profiles 209. Other modules can generate or derive their baseline acoustic measurements similarly.

In one embodiment, the security apparatus 200 in each module 102 can determine whether the current returned acoustic signals substantially match the expected returned acoustic signals. If the current returned acoustic signals are substantially different from the expected returned acoustic signals, the mismatch may indicate that the current physical arrangement of the computing system 100 is different from the default physical arrangement of the computing system 100, or the current location is not the desired location. This is because when a module 102 is removed, changed or added to the computing system 100 or when the location of the computing system 100 is changed, the returned acoustic signals will also be changed. The security apparatus 200 in each module 102 may take actions to prevent access to the sensitive data stored in the module.

In another embodiment, the security apparatus 200 in each module 102 can determine whether the current acoustic characteristics of the computing system 100 substantially match the expected acoustic characteristics stored in the acoustic profiles 209. If the current acoustic characteristics of the computing system 100, e.g., the current damping factors, natural or resonance frequencies of the computing system 100, are substantially different from the stored damping factors, natural or resonance frequencies in the acoustic profiles 209, the mismatch indicates that the current physical arrangement of the computing system 100 is different from the default physical arrangement of the computing system 100, or that the computing system 100 has been moved to a different physical location. This is because when a module 102 is removed, changed or added to the computing system 100 or when the location of the computing system 100 is changed, the acoustic characteristics of the computing system 100 will also be changed. The security apparatus 200 in each module 102 may take actions to prevent access to the sensitive data stored in the module.

In other embodiments, the modules may operate according to different operational acoustic patterns. For example, another operational acoustic pattern may be that the transmitters 201 in some of the modules 102 simultaneously transmit acoustic signals while the rest modules 102 are silent. Or the transmitters 201 in the modules 102 transmit acoustic signals at different times or with different durations. Other operational acoustic patterns indicating how the transmitters 201 in the modules 102 transmit acoustic signals may also be defined, as understood by an ordinary person in the art. In one embodiment, the operational acoustic patterns may be stored in the memory 207 of the security apparatus 200 in each module 102.

Figure 6:
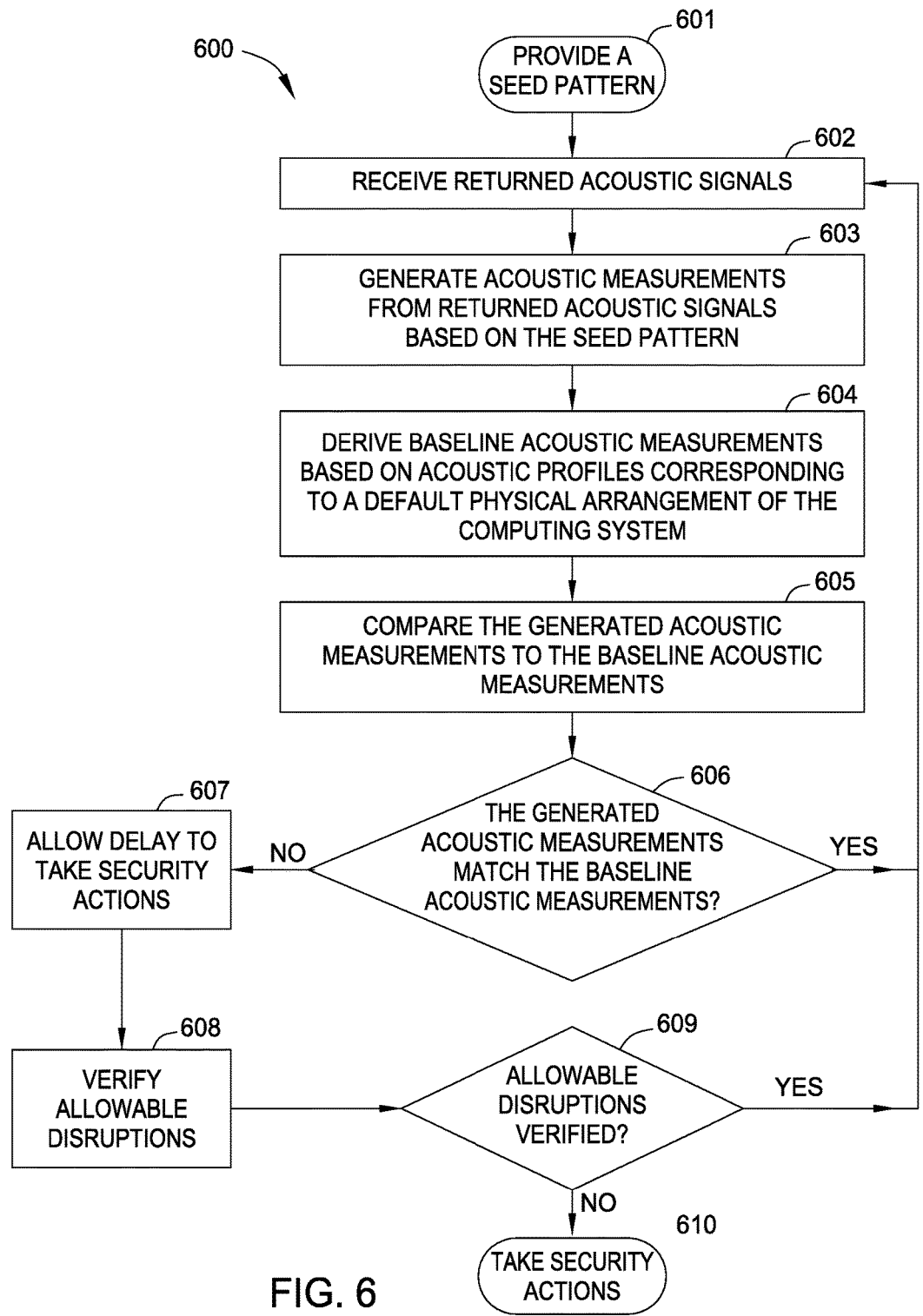
FIG. 6 shows a flow chart of operating a computing system including multiple modules, according to one embodiment herein.

FIG. 6 is a flow chart that shows a procedure 600 of operating the computing system 100 including multiple modules 102, according to one embodiment herein.

Now the computing system 100 is powered on and operating under a current physical arrangement in a current location. At block 601, a seed pattern is provided for all the modules 102 of the computing system 100 to transmit acoustic signals. In one embodiment, the seed pattern can be chosen by the configurator 206 of the security apparatus 200. In one embodiment, the seed pattern is chosen from a series of known operational patterns stored in the logic 205 of each module 102. The seed pattern may be chosen based on the required security level of the computing system 100. For example, when the required security level of the computing system 100 is high, the seed pattern may be a known operational pattern that multiple or all modules are transmitting acoustic signals according to their respective acoustic pattern simultaneously. On the other hand, when the required security level of the computing system 100 is low, the seed pattern may be a known operational pattern that only one module is transmitting acoustic signals according to its acoustic pattern.

At block 602, all the receivers 202 of the operating modules 102 in the computing system 100 are receiving current returned acoustic signals from the computing system 100.

At block 603, for each operating module 102, the security apparatus 200 generates acoustic measurements from the current returned acoustic signals based on the seed pattern. The acoustic measurements may include the amplitude and the frequencies of the current returned acoustic signals from the computing system 100 or the current acoustic characteristics of the computing system 100, as explained above.

At block 604, for each operating module 102, the security apparatus 200 derives baseline acoustic measurements based on the stored acoustic profiles 209 when the computing system 100 is under a default physical arrangement in a desired location. The baseline acoustic measurements may include the expected amplitude and the frequencies of the returned acoustic signals from the computing system 100 or the expected acoustic characteristics of the computing system 100, as explained above.

At block 605, for each operating module 102, the security apparatus 200 compares the module's generated acoustic measurements to the module's baseline acoustic measurements. For examples, the security apparatus 200 in each operating module 102 can compare the current returned acoustic signals with the expected returned acoustic signals, or compare the current acoustic characteristics with the expected acoustic characteristics, as explained above.

At block 606, for each operating module 102, the security apparatus 200 determines whether the generated acoustic measurements substantially match the baseline acoustic measurements. If, for a module 102, its generated acoustic measurements substantially match or equal to its baseline acoustic measurements ("Yes" at block 606), it indicates that the current physical arrangement of the computing system 100 is the same as the default physical arrangement of the computing system 100 and the current location is the same as the desired location. Then the procedure goes back to block 602 to continue receiving returned acoustic signals and monitoring the computing system 100.

If, for any module 102, its generated acoustic measurements do not substantially match or equal to its baseline acoustic measurements ("No" at block 606), it indicates one of two possible situations. The first possible situation is that the module's current returned acoustic signals include allowed external disruptive acoustic signals indicating that there are allowable or authorized actions currently performed, such as repairing of that module or maintaining of the computing system 100. It is not desired to take security actions in the first situation because taking security actions in the first situation will be disruptive to the allowable or authorized actions. The second possible situation is that the computing system 100 is not under the default physical arrangement or not in the desired location. It is necessary to take security actions in the second situation.

Thus, if for any module 102, its generated acoustic measurements do not substantially match or equal to its baseline acoustic measurements ("No" at block 606), the procedure first goes to block 607. Block 607 introduces a time delay or a suspension to take security actions by the security apparatus 200 of that module since the mismatch may indicate allowed external disruptive acoustic signals.

Then the procedure goes to block 608. At block 608, the security apparatus 200 of the module 102 verifies if its current returned acoustic signals include allowed external disruptive acoustic signals. As explained above, the allowed external disruptive acoustic signals can be sampled and stored as acoustic profiles 209 in the logic 205 of the security apparatus 200, which can be used for verification at block 608.

Then the procedure goes to block 609. At block 609, if it is verified that the module's current returned acoustic signals include allowed external disruptive acoustic signals ("Yes" at block 609), it indicates that there are allowable or authorized actions currently performed, such as repairing of that module or maintaining of the computing system 100. Thus, the physical arrangement of the computing system 100 may be changed with authorization or the location of the computing system 100 may be changed with authorization. In this situation, the computing system 100 is still considered as in safe operation. Then the procedure goes back to block 602 to continue receiving returned acoustic signals and monitoring the computing system 100.

However, at block 609, if it is verified that the module's current returned acoustic signals do not include allowed external disruptive acoustic signals ("No" at block 609), it indicates that the computing system 100 is not under the default physical arrangement or not in the desired location. In this situation, the procedure goes to block 610. At block 610, the security apparatus 200 of the module 102 asserts a signal indicating that the physical arrangement of the computing system 100 has been altered without authorization or the current location is not safe, i.e., the computing system 100 has been moved without authorization. At block 610, the security apparatus 200 of that module 102 also takes security actions to prevent access to the data stored in the module, e.g., erase the sensitive data automatically. In one embodiment, blocks 603 to 610 can be performed by the detector 208 of the security apparatus 200.

While the foregoing is directed to embodiments of the present invention, other and further embodiments of the invention may be devised without departing from the basic scope thereof, and the scope thereof is determined by the claims that follow.

What is claimed is:

1. A security apparatus, comprising:
    a transmitter configured to transmit acoustic signals in a computing system according to an acoustic pattern;
    a receiver configured to receive returned acoustic signals in response to the transmitted acoustic signals;
    a logic configured to:
        upon receiving the returned acoustic signals at the receiver, generate acoustic measurements from the returned acoustic signals based on the acoustic pattern, the generated acoustic measurements relating to a physical arrangement of computing components within the computing system;
        compare the generated acoustic measurements to baseline acoustic measurements, wherein the baseline acoustic measurements are derived from acoustic profiles corresponding to a default physical arrangement of computing components within the computing system; and
        upon determining that the generated acoustic measurements do not substantially match the baseline acoustic measurements, assert a signal indicating that the default physical arrangement of computing components within the computing system has been altered.

2. The security apparatus of claim 1, wherein the acoustic measurements comprise amplitude and/or frequencies of the returned acoustic signals.

3. The security apparatus of claim 1, wherein the acoustic measurements comprise current resonance frequency and/or natural frequency of the computing system.

4. The security apparatus of claim 1, wherein the baseline acoustic measurements comprise expected returned acoustic signals in response to the transmitted acoustic signals, and wherein the expected returned acoustic signals are corresponding to the default physical arrangement of the computing system.

5. The security apparatus of claim 1, wherein the baseline acoustic measurements comprise resonance frequency and/or natural frequency of the computing system under the default physical arrangement and wherein the returned acoustic signals comprise allowed external disruptive acoustic signals.

6. The security apparatus of claim 1, wherein the logic is further configured to prevent access to data stored in a module including the security apparatus.

7. A computer program product for a security apparatus, comprising:
    a non-transitory computer-readable storage medium having computer readable program code embodied therewith, the computer readable program code comprising:
        computer readable program code configured to, upon receiving returned acoustic signals at a receiver, generate acoustic measurements from the returned acoustic signals based on an acoustic pattern, the generated acoustic measurements relating to a physical arrangement of computing components within a computing system, wherein a transmitter in the security apparatus is configured to transmit acoustic signals in the computing system according to the acoustic pattern; and wherein the receiver in the security apparatus is configured to receive the returned acoustic signals in response to the transmitted acoustic signals;
        computer readable program code configured to compare the generated acoustic measurements to baseline acoustic measurements, wherein the baseline acoustic measurements are derived from acoustic profiles corresponding to a default physical arrangement of computing components within the computing system; and
        computer readable program code configured to, upon determining that the generated acoustic measurements do not substantially match the baseline acoustic measurements, assert a signal indicating that the default physical arrangement of computing components within the computing system has been altered.

8. The computer program product of claim 7, wherein the acoustic measurements comprise amplitude and/or frequencies of the returned acoustic signals.

9. The computer program product of claim 7, wherein the acoustic measurements comprise current resonance frequency and/or natural frequency of the computing system.

10. The computer program product of claim 7, wherein the baseline acoustic measurements comprise expected returned acoustic signals in response to the transmitted acoustic signals, and wherein the expected returned acoustic signals are corresponding to the default physical arrangement of the computing system.

11. The computer program product of claim 7, wherein the baseline acoustic measurements comprise resonance frequency and/or natural frequency of the computing system under the default physical arrangement.

12. The computer program product of claim 7, wherein the returned acoustic signals comprise allowed external disruptive acoustic signals.

13. The computer program product of claim 7, wherein the computer-readable program code further comprises:
   computer readable program code configured to prevent access to data stored in a module including the security apparatus.

14. A method, comprising:
   transmitting acoustic signals in a computing system according to an acoustic pattern;
   receiving returned acoustic signals in response to the transmitted acoustic signals;
   upon receiving the returned acoustic signals, generating acoustic measurements from the returned acoustic signals based on the acoustic pattern, the generated acoustic measurements relating to a physical arrangement of computing components within the computing system;
   comparing the generated acoustic measurements to baseline acoustic measurements, wherein the baseline acoustic measurements are derived from acoustic profiles corresponding to a default physical arrangement of computing components within the computing system; and
   upon determining that the generated acoustic measurements do not substantially match the baseline acoustic measurements, asserting a signal indicating that the default physical arrangement of computing components within the computing system has been altered.

15. The method of claim 14, wherein the acoustic measurements comprise amplitude and/or frequencies of the returned acoustic signals.

16. The method of claim 14, wherein the acoustic measurements comprise current resonance frequency and/or natural frequency of the computing system.

17. The method of claim 14, wherein the baseline acoustic measurements comprise expected returned acoustic signals in response to the transmitted acoustic signals, and wherein the expected returned acoustic signals are corresponding to the default physical arrangement of the computing system.

18. The method of claim 14, wherein the baseline acoustic measurements comprise resonance frequency and/or natural frequency of the computing system under the default physical arrangement.

19. The method of claim 14, further comprising:
   preventing access to data stored in a module including the security apparatus.

20. The security apparatus of claim 1, wherein the generated acoustic measurements relate to a physical arrangement of at least one of: a motherboard, a processor, a video card, a hard disk drive, a network card, and a memory.

* * * * *